(12) United States Patent
Lee et al.

(10) Patent No.: US 10,599,930 B2
(45) Date of Patent: Mar. 24, 2020

(54) METHOD AND APPARATUS OF DETECTING OBJECT OF INTEREST

(71) Applicant: Samsung Electronics Co., Ltd., Suwon-si (KR)

(72) Inventors: Wonju Lee, Suwon-si (KR); Jaewoo Lee, Hwaseong-si (KR); Dae Hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/992,234

(22) Filed: May 30, 2018

(65) Prior Publication Data
US 2019/0042860 A1 Feb. 7, 2019

(30) Foreign Application Priority Data
Aug. 4, 2017 (KR) .................. 10-2017-0099018

(51) Int. Cl.
G06K 9/00 (2006.01)
G06K 9/62 (2006.01)
G06T 7/11 (2017.01)
G06T 3/40 (2006.01)
G06K 9/32 (2006.01)

(52) U.S. Cl.
CPC ..... *G06K 9/00798* (2013.01); *G06K 9/00671* (2013.01); *G06K 9/00825* (2013.01); *G06K 9/3233* (2013.01); *G06K 9/6232* (2013.01); *G06T 3/40* (2013.01); *G06T 3/4053* (2013.01); *G06T 7/11* (2017.01); *G06T 2207/10012* (2013.01); *G06T 2207/20081* (2013.01); *G06T 2207/30256* (2013.01); *G06T 2210/12* (2013.01)

(58) Field of Classification Search
CPC .......... G06K 9/00798; G06K 9/00671; G06K 9/00825; G06K 9/6232; G06T 3/4053; G06T 7/11; G06T 3/40; G06T 2207/10012; G06T 2207/20081; G06T 2207/30256; G06T 2210/12
See application file for complete search history.

(56) References Cited

U.S. PATENT DOCUMENTS

| 2009/0067723 A1 | 3/2009 | Yamazaki et al. |
| 2011/0081046 A1 | 4/2011 | van Eekeren et al. |
| 2012/0051667 A1* | 3/2012 | Kang .............. G06T 3/4053 382/299 |
| 2014/0193032 A1* | 7/2014 | Zhang .............. G06T 5/003 382/103 |

(Continued)

FOREIGN PATENT DOCUMENTS

JP 2017-68747 A 4/2017

OTHER PUBLICATIONS

Li et al.; Deep Neural Network for Structural Prediction and Lane Detection in Traffic Scene; IEEE Transactions on Neural Networks and Learning Systems, vol. 28, No. 3, Mar. 2017; Feb. 16, 2016; pp. 690-703 (Year: 2016).*

*Primary Examiner* — Michael Le
(74) *Attorney, Agent, or Firm* — Sughrue Mion, PLLC

(57) ABSTRACT

Disclosed is a method and apparatus of detecting an object of interest, where the apparatus acquires an input image, sets a region of interest (ROI) in the input image, and detects the object of interest from a restoration image, having a resolution greater than a resolution of the input image, corresponding to the ROI.

23 Claims, 9 Drawing Sheets

(56) References Cited

U.S. PATENT DOCUMENTS

| | | | |
|---|---|---|---|
| 2014/0195138 A1* | 7/2014 | Stelzig | G08G 1/0116 |
| | | | 701/119 |
| 2014/0233795 A1* | 8/2014 | Omino | G06K 9/00805 |
| | | | 382/103 |
| 2016/0093023 A1* | 3/2016 | Prasad | G06K 9/3241 |
| | | | 382/173 |
| 2016/0171299 A1* | 6/2016 | Lee | G06K 9/00604 |
| | | | 382/128 |
| 2016/0339959 A1* | 11/2016 | Lee | B62D 15/0265 |
| 2017/0308760 A1* | 10/2017 | Kwon | G06T 7/11 |
| 2018/0012085 A1* | 1/2018 | Blayvas | G06K 9/00805 |

* cited by examiner

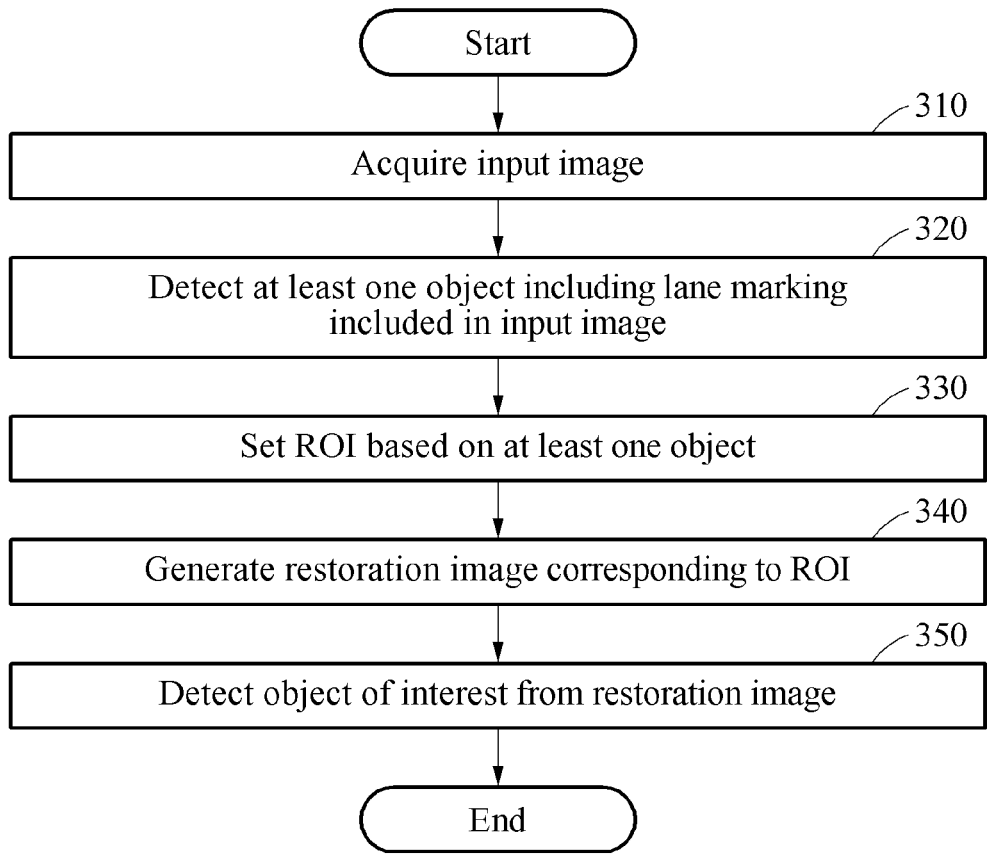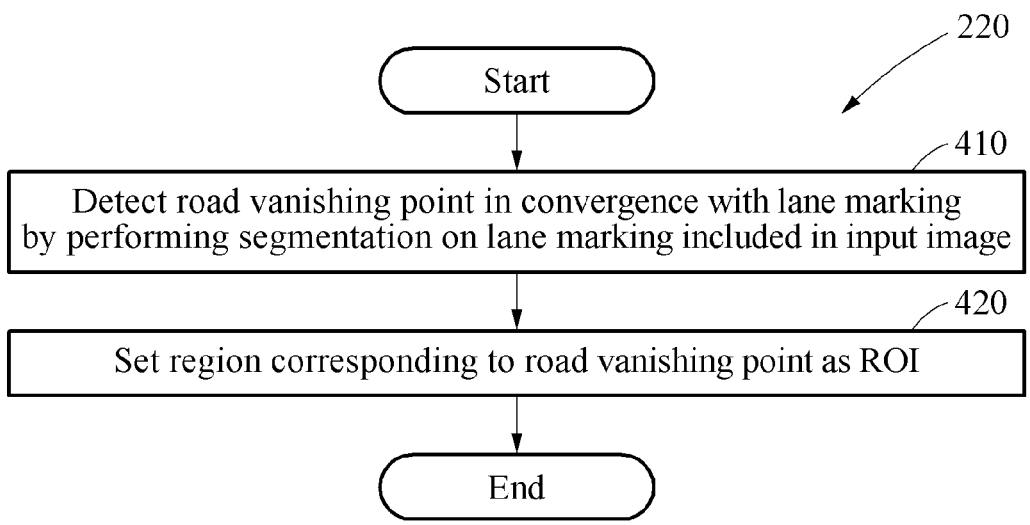

METHOD AND APPARATUS OF DETECTING OBJECT OF INTEREST

CROSS-REFERENCE TO RELATED APPLICATIONS

This application claims the benefit under 35 USC § 119(a) of Korean Patent Application No. 10-2017-0099018 filed on Aug. 4, 2017 in the Korean Intellectual Property Office, the entire disclosure of which is incorporated herein by reference for all purposes.

BACKGROUND

1. Field

The following description relates to a method and apparatus of detecting an object of interest.

2. Description of Related Art

Autonomous driving enables automatic performance of various driving operations. For example, an autonomous vehicle independently travels on a road without user intervention or without a driver operating the vehicle through a steering wheel, an accelerator pedal, or a brake pedal. For autonomous driving, an object may be detected and recognized using an image acquired from a vehicle.

An autonomous driving apparatus mainly uses a low-resolution camera to detect an object based on a cost and an image processing speed. A recognizable distance required by the autonomous apparatus is greater than or equal to 100 meters. However, it is difficult to extract a feature of an object at a distance of more than 100 meters from a low-resolution image of the object, because a low-resolution image includes a very small number of pixels. In particular, even though a traffic light and a road sign are objects that should be detected by a search for a route, it is difficult to identify such an object when the object is far away.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided there is provided a method of detecting an object of interest, the method including acquiring an input image, setting a region of interest (ROI) in the input image, generating a restoration image corresponding to the ROI, a resolution of the restoration image being greater than a resolution of the input image, and detecting the object of interest from the restoration image.

The setting of the ROI may include detecting at least one object including a lane marking in the input image, and setting the ROI based on the at least one object.

The setting of the ROI may include detecting a road vanishing point where a lane marking converges based on a segmentation of the lane marking in the input image, and setting a region corresponding to the road vanishing point as the ROI.

The region corresponding to the road vanishing point may include a region within a distance from the road vanishing point, and the distance is an inverse function of a number of lanes on a road.

The setting of the ROI may include calculating a reliability score of at least one object in the input image, and setting the ROI based on the reliability score.

The calculating of the reliability score may include calculating the reliability score of the at least one object in the input image by detecting a bounding box based on deep learning or image processing.

The setting of the ROI may include setting a region of the bounding box as the ROI based on a comparison of the reliability score to a threshold value.

The threshold value may vary depending on a type of the object.

The generating of the restoration image may include performing super resolution to increase pixel information by up-sampling on an image corresponding to the ROI, and generating the restoration image based on the increased pixel information.

The detecting of the object of interest may include detecting the object of interest from the ROI having the increased pixel information.

The generating of the restoration image may include capturing images associated with the ROI, and performing up-scaling on at least a portion of the images to generate a super resolution image associated with the ROI.

The method may include estimating a distance from the object based on a pixel difference of a restoration image corresponding to a stereo image, wherein the input image is the stereo image, and the generating of the restoration image may include generating the restoration image corresponding to the stereo image.

The input image may include at least one external image of a front view or a side view of a vehicle.

The ROI may include at least one of a portion of a region of the input image or at least one object included in the input image.

The object may include at least one of a road vanishing point, a road marking, a pedestrian, a vehicle, a traffic light, a lane marking, a traffic sign, a human, an animal, a plant, or a building.

In another general aspect, there is provided there is provided an apparatus for detecting an object of interest, the apparatus including a sensor configured to acquire an input image, and a processor configured to set a region of interest (ROI) in the input image, to generate a restoration image corresponding to the ROI, and to detect the object of interest from the restoration image, wherein a resolution of the restoration image is greater than a resolution of the input image.

The processor may be configured to detect at least one object including a lane marking in the input image, and to set the ROI based on the at least one object.

The processor may be configured to detect a road vanishing point where a lane marking converges based on a segmentation of the lane marking in the input image, and to set a region corresponding to the road vanishing point as the ROI.

The processor may be configured to calculate a reliability score of at least one object in the input image, and to set the ROI based on the reliability score.

The processor may be configured to calculate the reliability score of the at least one object by detecting a bounding box based on deep learning or image processing, and to set a region of the bounding box as the ROI based on a comparison of the reliability score to a threshold value.

The processor may be configured to perform super resolution to increase pixel information by up-sampling an image corresponding to the ROI, and to generate the restoration image based on the increased pixel information.

In another general aspect, there is provided there is provided an apparatus for detecting an object of interest including a sensor configured to acquire an input image, a head-up display (HUD), a memory configured to store map information and instructions, and a processor configured to execute the instructions to identify an object including a lane marking in the input image, set a region of interest (ROI) based on the object, generate a restoration image corresponding to the ROI, detect the object of interest from the restoration image having a higher resolution than a resolution of the input image, and output the restoration image and the object of interest through the HUD.

The memory may be configured to store information on the object of interest detected from the restoration image, and to provide information from object of interest detected from previous restoration image.

Other features and aspects will be apparent from the following detailed description, the drawings, and the claims.

BRIEF DESCRIPTION OF THE DRAWINGS

FIGS. 2 and 3 are diagrams illustrating examples of a method of detecting an object of interest.

FIGS. 4 and 6 are diagrams illustrating examples of a method of setting a region of interest (ROI).

Figure 1:
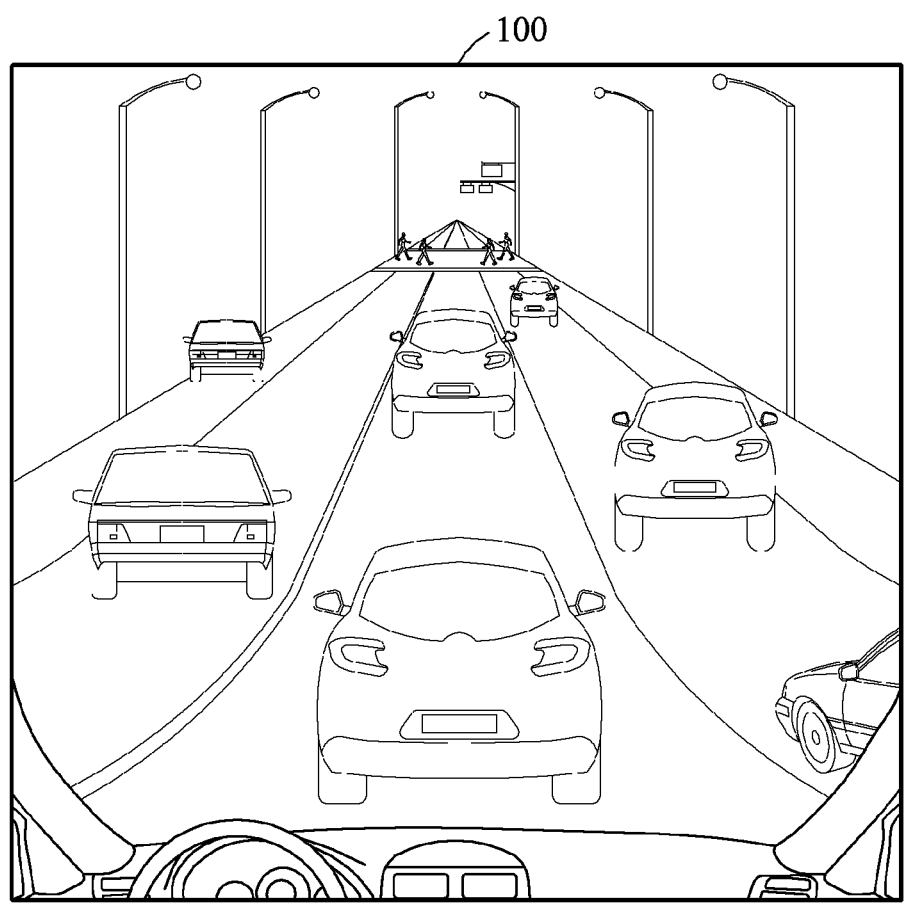
FIG. 1 illustrates an example of an environment in which a method of detecting an object of interest is performed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

The following embodiments may be applied to indicate a lane in an augmented reality navigation system in, for example a smart vehicle, or generate visual information for assisting steering of an autonomous driving vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone. In an example, the apparatus for detecting an object of interest is applicable to a robot requiring a positioning operation. The embodiments may also be used to interpret the visual information in a device including an intelligent system such as a head-up display (HUD) installed for driving assistance in a vehicle or a fully autonomous driving system to assist safe and comfortable driving.

In an example, the apparatus for detecting an object of interest disclosed herein is incorporated in various types of mobile terminals such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, other consumer electronics/information technology(CE/IT) device, or any other device capable of wireless communication or network communication consistent with that disclosed herein. However, the mobile terminal is not limited to the examples described in the forgoing.

Hereinafter, a "road" includes an expressway, a national road, a local road, and a national expressway on which vehicles are traveling. A road includes one road lane or a plurality of road lanes. A "driving road lane" may be any one road lane used by a vehicle or a road lane on which a vehicle is travelling among a plurality of road lanes. The road lanes may be distinguished by a lane marking indicated on a road surface. One road lane may be distinguished by lane markings on the right and the left of the road lane. A "road marking" is a marking indicated on a road surface on which a vehicle is traveling. The road marking includes a lane marking, for example, a centerline and a guidance line, and a non-lane marking, for example, a traffic symbol such as a crosswalk, a progress direction guidance line, a left-turn forbidden line, and a lane change line, and a traffic word such as a children protection zone and a slow speed zone.

FIG. 1 illustrates an example of an environment in which a method of detecting an object of interest is performed. FIG. 1 illustrates an input image 100 of a front view of a vehicle.

In an example, an autonomous driving vehicle captures objects such as, for example, a vehicle, a human, a traffic light, a traffic sign, and a lane using various capturing devices when recognizing a road situation. The autonomous driving vehicle may avoid a collision by detecting information on a lane and a neighboring vehicle from a captured image, and searching for a route, and controlling horizontal and vertical directions by detecting and/or identifying a traffic sign and a traffic light.

Because an object located far away from the autonomous driving vehicle has a small number of pixels in an image, it is difficult to extract a feature of the object, and thus, a recognition rate of the object is reduced. A difference between pixels of an image captured by a right camera and pixels of an image captured by a left camera may be used when an object distance is estimated based on a stereo image. When the object distance is estimated based on the stereo image, an estimation performance may be reduced because a distant object or a small object has a small number of pixels.

In an example, the input image 100 is captured by a capturing device, which is included in a vehicle and is disposed to face a front of a vehicle while driving on a road. For example, as illustrated in the input image 100, a size of a distant object such as a traffic sign, a traffic light, a crosswalk, and a pedestrian is small such that the distant object may have a small number of pixels in the input image 100. Therefore, it is difficult to extract features of objects (distant traffic sign, distant traffic light, and distant pedestrian) such that a performance for detecting the objects may be lower than a performance for detecting a neighboring vehicle or closer objects. When the autonomous driving vehicle is unable to detect real objects on a road due to a low detection performance, an accident may occur.

When a number of pixels of an object in an input image is small or a reliability of detecting an object is relatively low, more accurate information for route searching and collision avoidance of the autonomous driving vehicle may be provided while increasing the reliability and a probability of detecting object by increasing pixel information of a region of interest (ROI) based on a super resolution technology.

Figure 2:
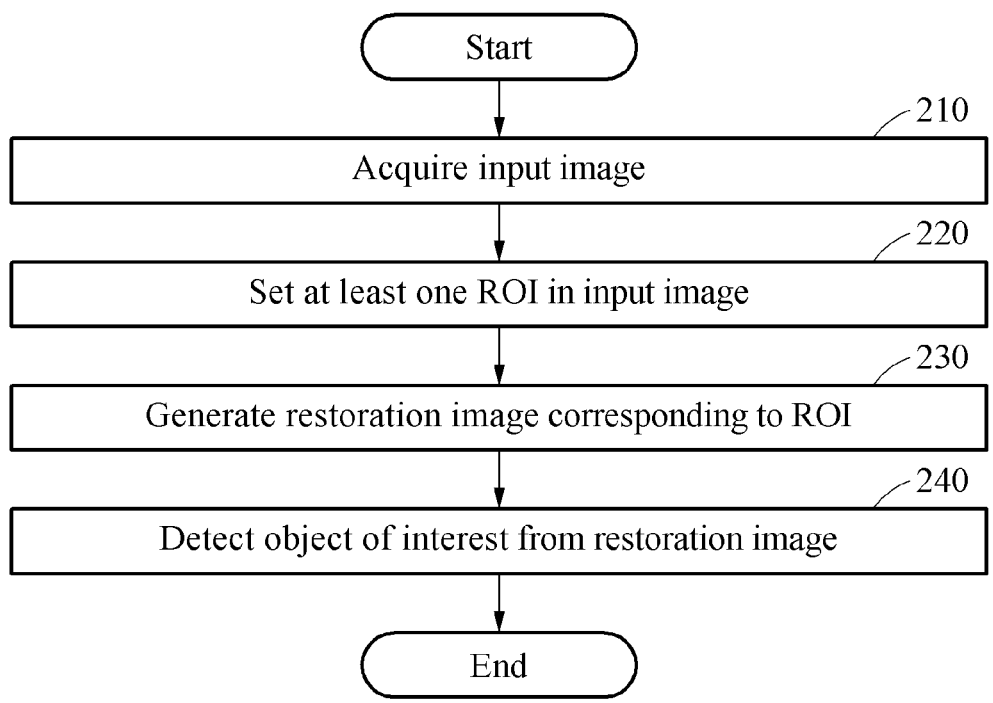

FIG. 2 is a diagram illustrating an example of a method of detecting an object of interest. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 210, an apparatus for detecting an object of interest acquires an input image. Hereinafter, an apparatus for detecting an object is also referred to as a detecting apparatus. For example, the input image is acquired by a capturing device included in a vehicle and disposed to capture a front view or each side view of the vehicle, while the vehicle is driving on a road. The input image includes, for example, an external image of at least one of a front view or each side view of the vehicle. In an example, the input image includes a road surface image and a road image. The road image may include, for example, a vehicle, a lane, a curb, a sidewalk, and a surrounding environment. The input image may include various images such as an infrared image, a depth image, and a stereo image, in addition to a color image and a black and white image.

The detecting apparatus may acquire one input image or a plurality of input images for each frame using the capturing device. In an example, it is assumed that calibration information of the capturing device is known in advance. The capturing device includes, for example, a mono camera, a three-dimensional (3D) stereoscopic camera, a vision sensor, a complementary metal-oxide semiconductor (CMOS) image sensor, or a device for performing similar operations. The input image may be an image captured by the capturing device included in an identifying device or a device other than the identifying device.

In an example, the detecting device receives sensor information captured using a light imaging, detection, and ranging (LIDAR) sensor and a radar sensor in addition to the input image captured by the capturing device. The sensor information may include, for example, depth information indicating a distance between the input image and a detected object.

In operation 220, the detecting apparatus sets at least one region of interest (ROI) in the input image. The ROI includes at least one of a portion of a region of the input image or at least one object included in the input image. An object may include, for example, a vehicle other than vehicle that is being driven, a road vanishing point, a road marking, a pedestrian, a vehicle, a traffic light, a lane marking, a traffic sign, a human, an animal, a plant, and a building, but the object is not limited thereto. In an example, the portion of region in the input image may be a region including at least one object. In another example, the portion of region in the input image may be a separate portion of region not including an object and may include, for example, a road boundary portion.

In an example, the detecting apparatus may set the road vanishing point as an ROI by performing road segmentation based on deep learning or set a box having a low reliability score as an ROI by detecting a bounding box. Further description of a method by which the detecting apparatus sets an ROI is provided with reference to FIGS. 3 through 7.

In operation 230, the detecting apparatus generates a restoration image corresponding to the ROI. In this example, the restoration image has a resolution greater than or equal to a resolution of the input image. In an example, the restoration image is acquired by restoring, in high-resolution or super-resolution, a portion corresponding to the ROI in the input image. For example, when an input image has a resolution less than or equal to 1280×720, a restoration image may be acquired by restoring a portion corresponding to an ROI in the input image, in super resolution of 4K (3840×2160) ultra high definition (UHD). In an example, the restoration image is referred to as a super-resolution image.

In an example, the detecting apparatus increases pixel information by performing up-sampling on the image corresponding to the ROI based on, for example, a super resolution technology, and generate the restoration image based on the increased information. In an example, the super resolution clarifies a feature of an object using a nonlinear function based on a neighboring pixel. In an example, the super resolution is applied only to an ROI other than the entire input image such that a performance of detecting an object which is difficult to detect is enhanced. Further description of a method by which the detecting apparatus generates the restoration image is provided with reference to FIG. 8.

In operation 240, the detecting apparatus detects the object of interest from the restoration image. The detecting apparatus may detect the object of interest from the restoration image using, for example, a convolution neural network (CNN), a deep neural network (DNN), and a support vector machine that are pre-trained to recognize objects of interest such as a road marking and a vehicle. The CNN may learn, in advance, a human, a vehicle, and a road marking such as a lane marking and a crosswalk marking of various road surface images, and may be associated with a region-based CNN. The CNN may learn, in advance, types of a lane marking and a non-lane marking to be detected and bounding boxes of the lane marking and the non-lane marking to be detected from the input image.

Similar to the above-described object, the object of interest may include, for example, a vehicle other than the vehicle that is being driven, a road vanishing point, a road marking, a pedestrian, a vehicle, a traffic light, a lane marking, a traffic sign, a human, an animal, a plant, and a building, but the object of interest is not limited thereto.

The object of interest may be robustly detected in various situations by using neural networks that learn lane markings and/or non-lane markings of various road surface images. In addition, an identifying apparatus may detect the object of interest based on various machine learning methods.

In an example, the detecting apparatus projects the detected object of interest, the restoration image, and/or the input image to a front glass or a separate screen of the vehicle using a head-up display (HUD). The detecting apparatus may project the object of interest detected in operation 240, the restoration image, and/or the input image to a wind shield glass or a separate screen. However, the displaying of the detected object of interest, the restoration image, and/or the input image is not limited to the example described above, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the detecting apparatus may be used without departing from the spirit and scope of the illustrative examples described. In addition, the detecting apparatus may project and overlay the detected object of interest on the restoration image and/or the input image.

The autonomous driving vehicle may easily search for a route and control vertical and horizontal directions by identifying a distant traffic sign, a distant pedestrian, and a distant traffic light using the restoration image including the object of interest received from the detecting apparatus. For example, the detecting apparatus may be included in the autonomous driving vehicle or provided as a separate apparatus from the autonomous driving vehicle.

FIG. 3 is a diagram illustrating another example of a method of detecting an object of interest. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, a detecting apparatus acquires an input image. In operation 320, the detecting apparatus detects at least one object including a lane marking included in the input image.

In operation 330, the detecting apparatus sets a region of interest (ROI) based on the at least one object.

In operation 340, the detecting apparatus generates a restoration image corresponding to the ROI. For example, when the input image is a stereo image, the detecting apparatus generates a restoration image corresponding to the stereo image. In an example, the detecting apparatus may estimate a distance from an object based on a pixel difference of the restoration image corresponding to the stereo image.

In operation 350, the detecting apparatus detects an object of interest from the restoration image.

In an example, a lane marking and a crosswalk marking are used to identify information for searching for a route of an autonomous driving vehicle and avoiding collision. Thus, the detecting apparatus detects an object, for example, a lane marking and a crosswalk marking, from the input image, and automatically set a range around the detected object as an ROI. In an example, the detecting apparatus enhances a detection performance by generating the restoration image by applying a super resolution technology to the ROI and then re-detecting the object (object of interest) from the restoration image.

The detecting apparatus may set an object of interest in an input image corresponding to a current point in time t or a next point in time t+1 based on a detection result of an input image corresponding to a previous point in time t−1, and (re)detect an object based on a time-varying method of only detecting a region of the object of interest by performing up-sampling. In an example, a threshold of redetection performance based on the super resolution technology may be determined by the detection performance of a lossless image having a size of an up-sampled image.

Figure 5:
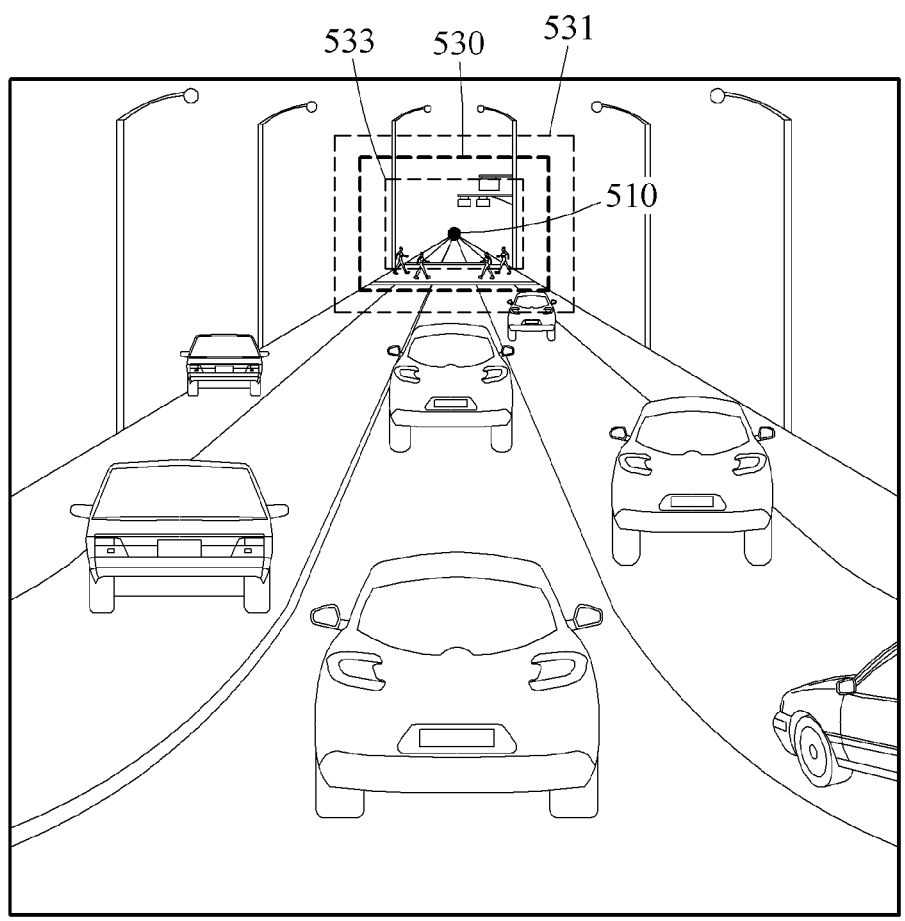
FIGS. 5 and 7 illustrate examples of a method of setting a region of interest (ROI).

FIG. 4 is a diagram illustrating an example of a method of setting a region of interest (ROI), and FIG. 5 illustrates an example of the method of setting the ROI of FIG. 4. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIGS. 4 and 5, in operation 410, a detecting apparatus detects a road vanishing point 510 in convergence with a lane marking by performing segmentation on the lane marking included in an input image. In an example, a road vanishing point, which is the point at which the lane markings converge, may correspond to a later traveling region of the autonomous driving vehicle. A road vanishing point and a neighboring region of the road vanishing point may be significant for setting a route and a control parameter. The detecting apparatus may detect a road vanishing point by applying a super resolution technology to estimate a distance between objects when the detected object is of a relatively small size. In an example, the detecting apparatus recognizes the lane marking included in the input image by performing segmentation on the input image, and detects the road vanishing point where the lane markings converge.

In another example, the detecting apparatus performs the segmentation on the input image by dividing an object in the input image in a semantic unit, analyzing significations of the divided regions of the object in a pixel unit, and labeling the divided regions for each class. In an example, a class includes twenty classifications, such as, for example, a lane, a vanishing point, a road, a vehicle, a sidewalk, a human, an animal, a building, and sky. An identifying apparatus may accurately detect positions of a lane, a road vanishing point, and a vehicle from a pixel-based label included in the input image on which the segmentation is performed.

In operation 420, the detecting apparatus sets a region corresponding to the road vanishing point as the ROI. An ROI may be set as, for example, a box 530 indicated in a dotted line. A "region corresponding to a road vanishing point" may be understood as a road vanishing point and a region within a range (or certain distance) from the road vanishing point. In an example, the range (or certain distance) may vary depending on factors such as, for example, a number of lanes in a corresponding region, a degree of congestion of the region, and whether a traffic light, a traffic sign, or whether a crosswalk is present. For example, the detecting apparatus may increase a size of an ROI as a box 531 by increasing the range as the number of lanes increases. The detecting apparatus may decrease the ROI as a box 533 by decreasing the range as the number of lanes decreases. For example, the detecting apparatus increases the range in response to the number of all lanes being greater than or equal to 4 when a one way road is a four-lane road. The detecting apparatus may decrease the range in response to the number of all lanes being less than or equal to 2 when the one way road is a two-lane road.

The detecting apparatus may increase the range in response to a region in the input image being a congested region, such as, in a downtown. The detecting apparatus may identify whether the region is congested by counting a number of objects included in the range.

When a traffic light and/or a crosswalk are present in the vicinity of a road vanishing point or within the range from the road vanishing point, the detecting apparatus may increase or decrease the range such that the traffic light and/or the crosswalk are included in the range.

In an example, the detecting apparatus estimates a distance from an object by applying super resolution to a region corresponding to a road vanishing point.

Figure 6:
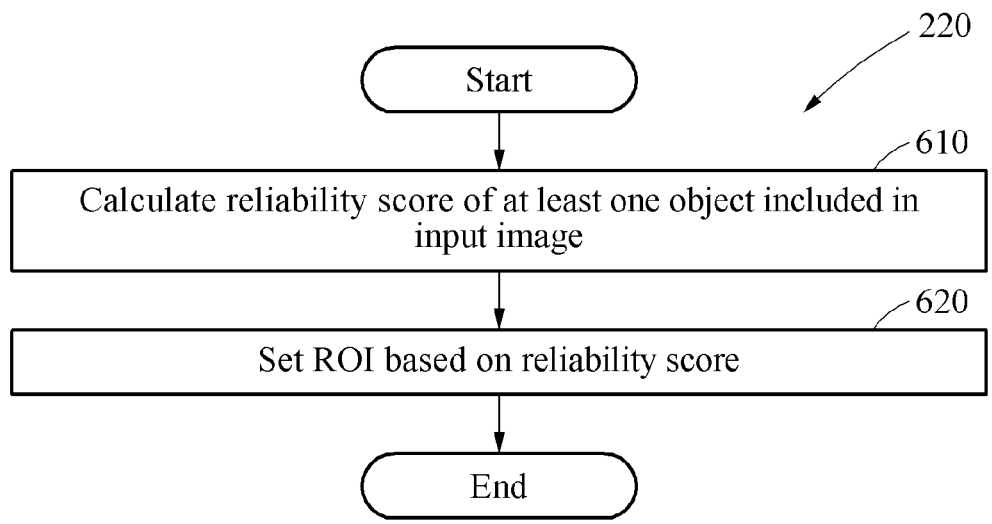
Figure 7:
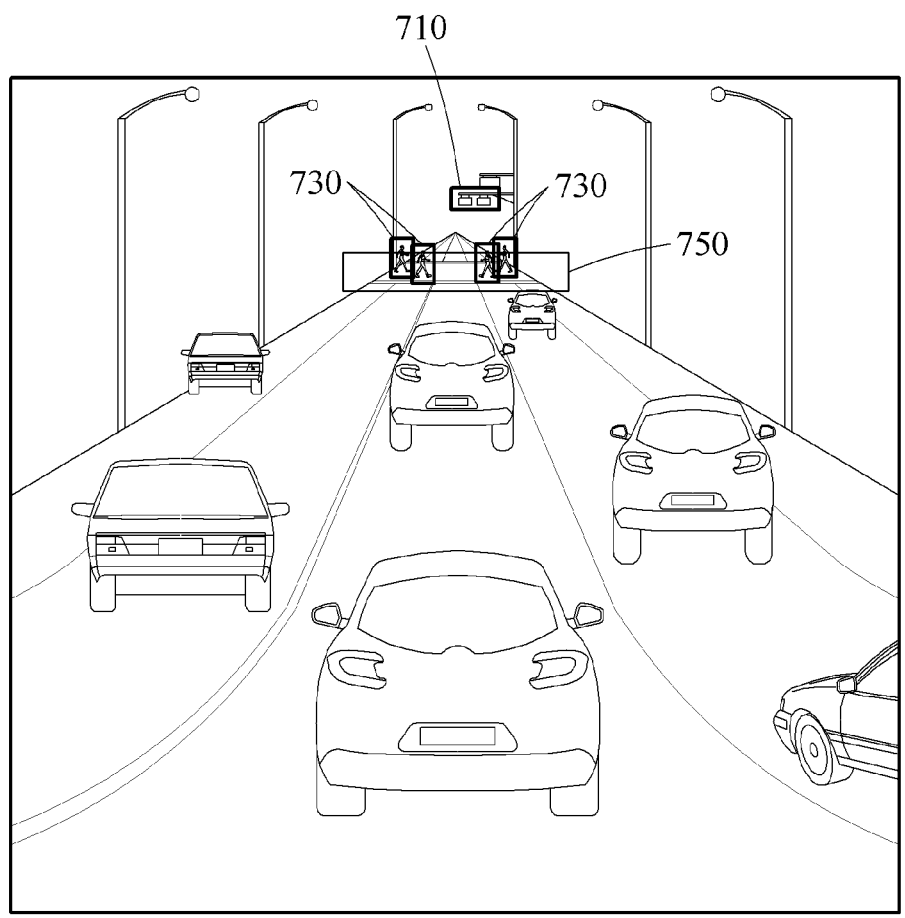

FIG. 6 is a diagram illustrating another example of a method of setting a region of interest (ROI), and FIG. 7 illustrates an example of the method of setting the ROI of FIG. 6. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In operation 610, a detecting apparatus calculates a reliability score of at least one object included in an input image. The detecting apparatus may set bounding boxes 710, 730, and 750 for one or more objects included in the input image through bounding box detection based on deep learning or image processing, and calculate the reliability score of at least one object included in the bounding boxes 710, 730, and 750. A "reliability score" may be understood as a reliability of detection or a probability that an object is detected from a bounding box. For example, a reliability score of an object (traffic light) included in the bounding box 710 is 0.98, a reliability of an object (pedestrian) included in the bounding box 730 is 0.78, and a reliability of an object (crosswalk marking) included in the bounding box 750 is 0.62.

In operation 620, the detecting apparatus sets a region of interest (ROI) based on the reliability score. In an example, the detecting apparatus sets a region of a bounding box as the ROI based on whether the reliability score corresponds to a threshold value. In an example, the detecting apparatus sets, as an ROI, a region of a bounding box corresponding to an object of which a reliability score is less than a threshold value or an object of which a reliability score corresponds to a section.

For example, when a threshold value is 0.75, the detecting apparatus may set, as an ROI, a region of the bounding box 750 where the reliability score is less than 0.75, i.e., a region corresponding to a crosswalk marking.

The threshold value may vary depending on a type (vehicle, human, traffic light, and traffic sign) of an object included in a bounding box or a class of an object.

In an example, more accurate object detection information is provided for an autonomous driving vehicle by clarifying a feature of an object whose reliability score is less than or equal to a threshold or a specific interval. In an example, the object is re-detected based on a super resolution when the position of the object or the identification of the object is unclear.

Figure 8:
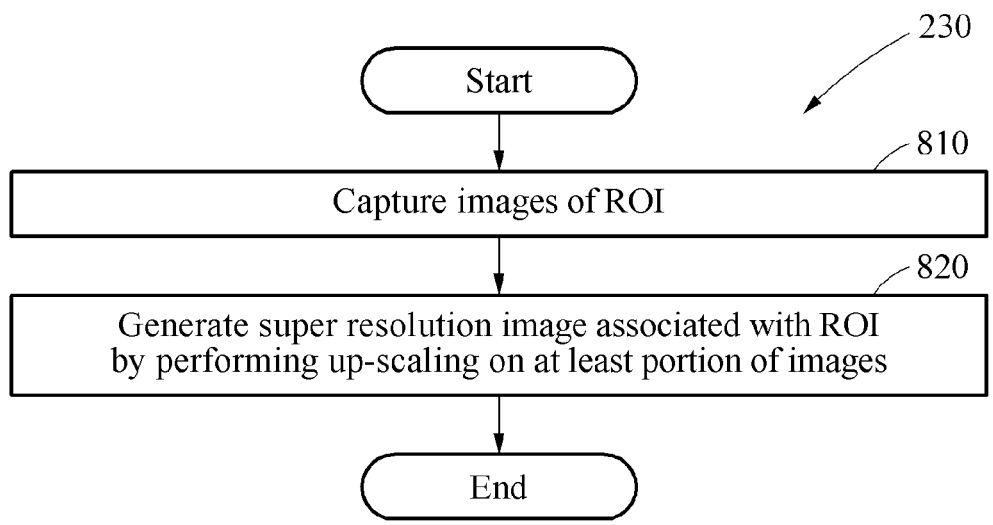
FIG. 8 illustrates an example of a method of generating a restoration image.

FIG. 8 is a diagram illustrating an example of a method of generating a restoration image. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

In operation 810, a detecting apparatus captures a plurality of images associated with a region of interest (ROI). The images associated with the ROI may be input images or images having a resolution lower than that of a super resolution image. In an example, the images may be burst images.

In operation 820, the detecting apparatus generates a super resolution image associated with the ROI by performing up-scaling on at least a portion of the images. In an example, the detecting apparatus calculates a relational equation between a high-resolution image and low-resolution images by analyzing a frequency based on a relative difference between the images having relatively low resolution. In an example, the detecting apparatus generates the super resolution image for the ROI based on the calculated relational equation.

The "up-scaling" may be understood supplying a lacking portion of an image by adjusting a size of a digital image or enhancing a resolution. The detecting apparatus may generate the super resolution image associated with the ROI by performing up-scaling on at least a portion of the images based on various scaling algorithms, such as, for example, a nearest-neighbor interpolation, bilinear and bicubic algorithms, an edge-directed interpolation, a box sampling, and deep convolutional neural networks.

The restoration image, i.e., a super resolution image is generated by applying a super resolution technology only to an ROI rather than the entire input image such that a detection speed and a detection accuracy of an object of interest are enhanced and a load of a processor is reduced.

Figure 9:
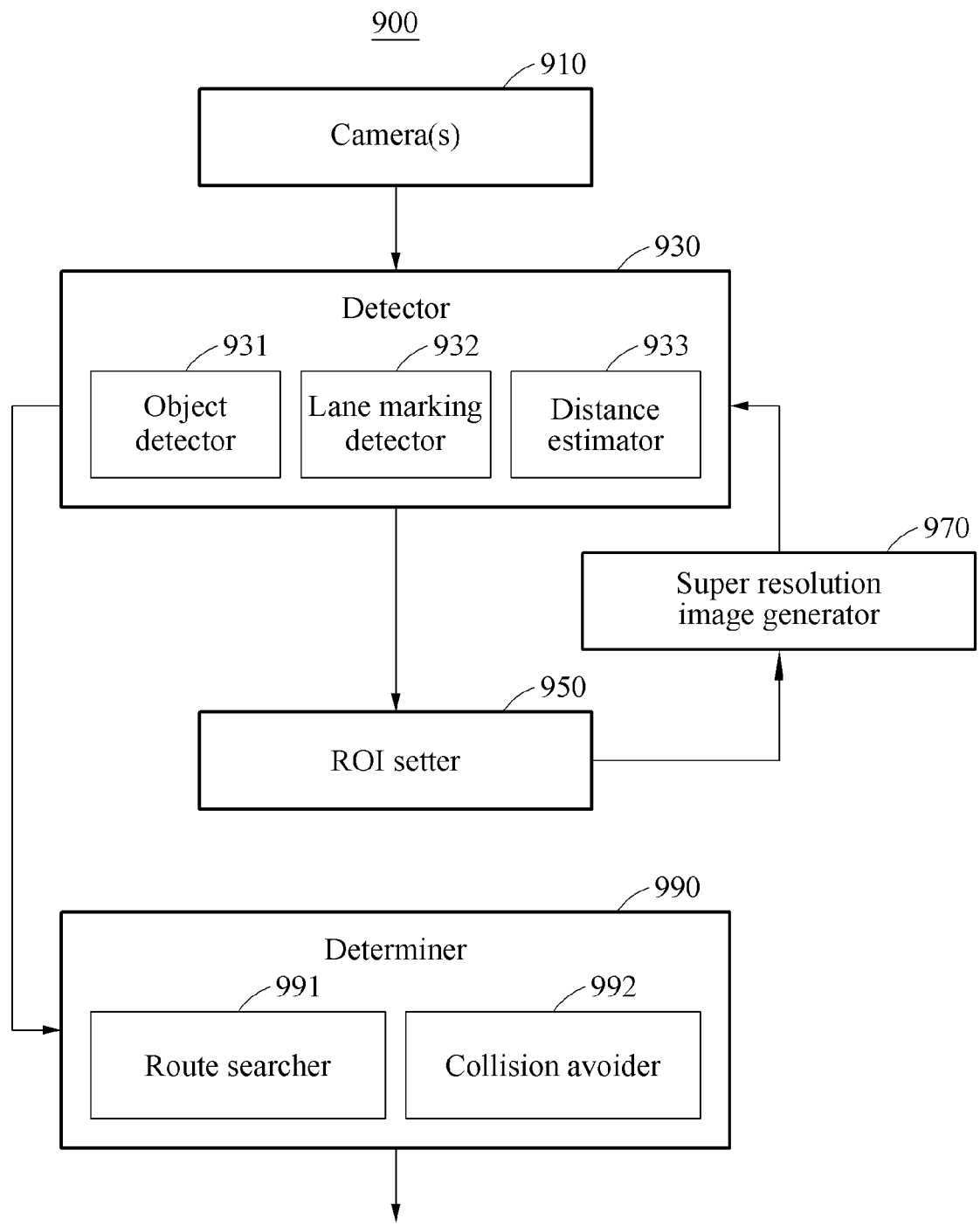
FIGS. 9 and 10 are diagrams illustrating examples of an apparatus for detecting an object of interest.

FIG. 9 is a diagram illustrating an example of an apparatus for detecting an object of interest. A detecting apparatus 900 includes camera(s) 910, a detector 930, a region of interest (ROI) setter 950, a super resolution image generator 970, and a determiner 990. The detector 930, the ROI setter 950, the super resolution image generator 970, and the determiner 990 may be implemented by one or more processors.

The camera 910 captures an external image of a front view of a vehicle. The camera 910 may capture the front view of the vehicle as, for example, a color image, but this is not limited thereto. In addition, a plurality of cameras may be used.

The detector 930 may include an object detector 931 to detect an object, a lane marking detector 932 to detect a lane marking, and a distance estimator 933 to estimate a distance.

In an example, the ROI setter 950 and/or the determiner 990 receives information on the object, the lane marking, and the distance detected by the detector 930. In an example, the information on the object, the lane marking, and the distance transferred to the ROI setter 950 is used by the ROI setter 950 to set an ROI. In an example, the information on the ROI set by the ROI setter 950 is transferred to the super resolution image generator 970 and used to generate a restoration image corresponding to the ROI. In an example, the restoration image generated by the super resolution image generator 970 is transferred to the detector 930 again and is used to detect the ROI from the restoration image.

In an example, the determiner includes an route searcher 991 and a collision avoider 992. In an example, the information on the object, the lane marking, and the distance is transferred to the determiner 990 and is used by the route searcher 991 to search for a driving route of an autonomous driving vehicle, is used by the collision avoider 992 to determine a speed and a direction of the autonomous driving vehicle, and to generate various control parameters for avoiding a collision.

Figure 10:
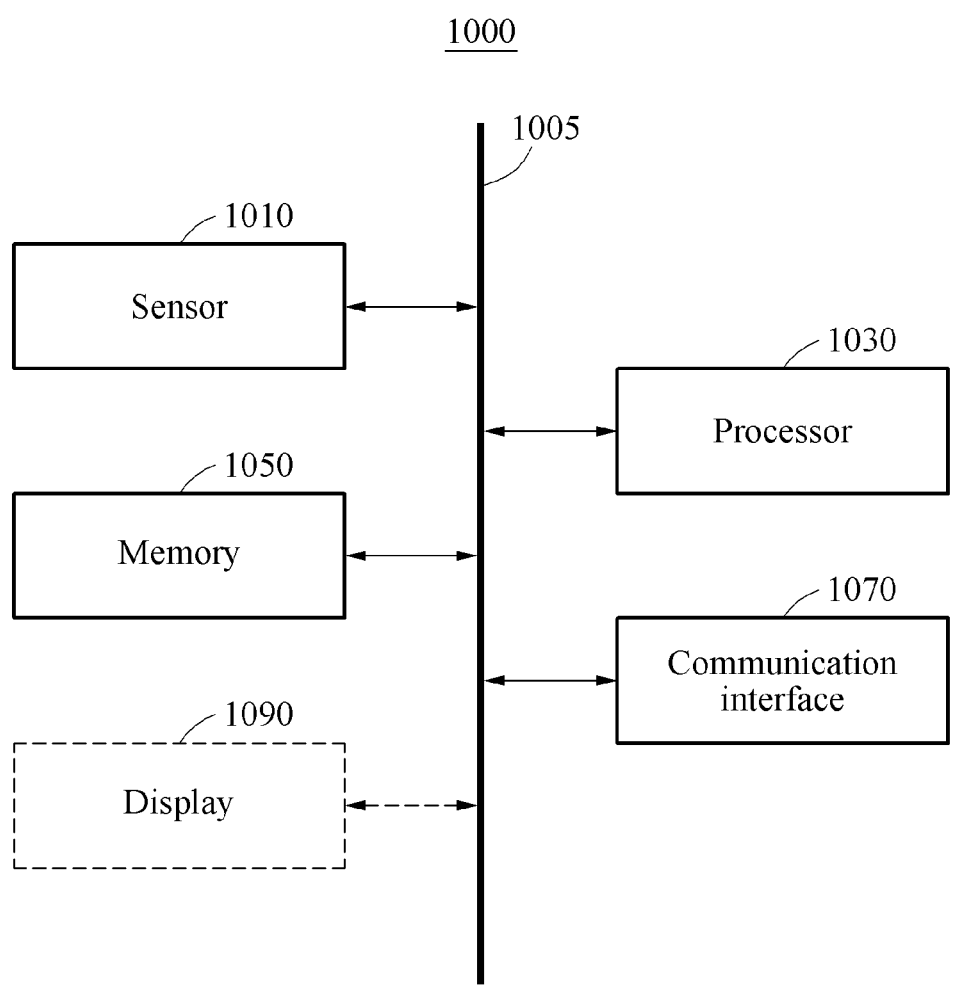

FIG. 10 is a diagram illustrating an example of an apparatus for detecting an object of interest. A detecting apparatus 1000 includes a sensor 1010 and a processor 1030. The detecting apparatus 1000 further includes a memory 1050, a communication interface 1070, and a display 1090. The sensor 1010, the processor 1030, the memory 1050, the communication interface 1070, and the display 1090 may communicate each other via a communication bus 1005.

The sensor 1010 acquires an input image. The single sensor 1010 or a plurality of sensors may be provided. The sensor 1010 may be, for example, an image sensor, a vision sensor, or a light imaging, detection, and ranging (LIDAR) sensor, but the sensor 1010 is not limited thereto.

The processor 1030 sets at least one region of interest (ROI) in the input image and generates a restoration image corresponding to the ROI. The restoration image may be a high-resolution image or a super resolution image having a resolution greater than a resolution of the input image. The processor 1030 detects an object of interest from the restoration image.

The processor 1030 detects at least one object including a lane marking included in the input image, and sets the ROI based on the at least one object. The processor 1030 detects a road vanishing point based on the lane marking by performing segmentation on the lane marking included in the input image, and sets a region corresponding to the road vanishing point as the ROI.

The processor 1030 calculates a reliability score of the at least one object included in the input image, and sets the ROI based on the reliability score. The processor 1030 calculates the reliability score of the at least one object included in the input image by detecting a bounding box based on deep learning or image processing. The processor 1030 sets a region of the bounding box as the ROI based on whether the reliability score corresponds to a threshold section.

In an example, the processor 1030 increases pixel information by performing up-sampling on an image corresponding to the ROI based on a super resolution technology, and generates the restoration image based on the increased pixel information.

In an example, the processor 1030 performs at least one of the above-described methods provided with reference to FIGS. 1 through 9. The processor 1030 executes a program and controls the detecting apparatus 1000. A program code executed by the processor 1030 may be stored in the memory 1050.

The processor 1030 may be provided as, for example, a central processing unit (CPU) or a graphics processing unit (GPU). Further detail on the processor 1030 is provided below.

The memory 1050 stores the input image and the restoration image generated by the processor 1030. The memory 1050 may store information on the object of interest detected from the restoration image. The memory 1050 may be used again to rapidly identify invariable information such as, for example, a crosswalk, a traffic sign, a lane, and a surrounding topography, when an autonomous driving vehicle passes by a same region. An image processing speed for object detection may be enhanced and a processing load of the processor 1030 may be reduced using the information stored in the memory 1050 by considering that the autonomous driving vehicle mainly travels on a same route during a commute. The memory 1050 may be a volatile memory or a non-volatile memory. Further detail on the memory 1050 is provided below.

The communication interface 1070 may receive the input image captured from an outside of the detecting apparatus 1000 or sensor information, global positioning system (GPS) information, and map information received from the outside of the detecting apparatus 1000. In an example, the communication interface 1070 transmits the restoration image and the object of interest detected from the restoration image to an outside source of the detecting apparatus 1000 or a head-up display (HUD). In an example, the object of interest is output as audio signal through a speaker included in the vehicle.

The display 1090 displays the object of interest in addition to the restoration image. In an example, the display 1090 is a physical structure that includes one or more hardware components that provide the ability to render a user interface and/or receive user input. In an example, the display 1090 can be embedded in the detecting apparatus 1000. In an example, the display 1090 is an external peripheral device that may be attached to and detached from the detecting apparatus 1000. The display 1090 may be a single-screen or a multi-screen display.

The display 1090 may display the input image and the restoration image including the object of interest together, or separately display the input image and the restoration image. In an example, the display 1090 may be provided as an HUD included in the vehicle. However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the detecting apparatus 1000 may be used without departing from the spirit and scope of the illustrative examples described.

The detecting apparatus 900, detecting apparatus 1000, detector 930, region of interest (ROI) setter 950, super resolution image generator 970, determiner 990, object detector 931, lane marking detector 932, distance estimator 933, route searcher 991, collision avoider 992, and other apparatuses, units, modules, devices, and other components described herein with respect to FIGS. 9 and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4, 6, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting an object of interest, the method comprising:
    acquiring an input image, the input image including at least one external image of a front view or each side view of the vehicle while driving on a road;
    setting a region of interest (ROI) in the input image;
    generating a restoration image corresponding to the ROI, a resolution of the restoration image being greater than a resolution of the input image; and
    detecting the object of interest from the restoration image, wherein the detecting comprises:
        setting the object of interest in the input image corresponding to a current point in time t or a next point in time t+1 based on a detection result of the input image corresponding to a previous point in time t−1, and
        redetecting an object based on a time-varying method of only detecting a region of the object of interest by performing up-sampling.

2. The method of claim 1, wherein the setting of the ROI comprises:
    detecting at least one object comprising a lane marking in the input image; and
    setting the ROI based on the at least one object.

3. The method of claim 1, wherein the setting of the ROI comprises:
    detecting a road vanishing point where a lane marking converges based on a segmentation of the lane marking in the input image; and
    setting a region corresponding to the road vanishing point as the ROI.

4. The method of claim 3, wherein the region corresponding to the road vanishing point comprises a region within a distance from the road vanishing point, and the distance is an inverse function of a number of lanes on a road.

5. The method of claim 1, wherein the setting of the ROI comprises:
    calculating a reliability score of at least one object in the input image; and
    setting the ROI based on the reliability score.

6. The method of claim 5, wherein the calculating of the reliability score comprises calculating the reliability score of the at least one object in the input image by detecting a bounding box based on deep learning or image processing.

7. The method of claim 6, wherein the setting of the ROI comprises setting a region of the bounding box as the ROI based on a comparison of the reliability score to a threshold value.

8. The method of claim 7, wherein the threshold value varies depending on a type of the object.

9. The method of claim 1, wherein the generating of the restoration image comprises:
performing super resolution to increase pixel information by up-sampling on an image corresponding to the ROI; and
generating the restoration image based on the increased pixel information.

10. The method of claim 9, wherein the detecting of the object of interest comprises:
detecting the object of interest from the ROI having the increased pixel information.

11. The method of claim 1, wherein the generating of the restoration image comprises:
capturing images associated with the ROI; and
performing up-scaling on at least a portion of the images to generate a super resolution image associated with the ROI.

12. The method of claim 1, further comprising:
estimating a distance from the object based on a pixel difference of a restoration image corresponding to a stereo image,
wherein the input image is the stereo image, and the generating of the restoration image comprises generating the restoration image corresponding to the stereo image.

13. The method of claim 1, wherein the ROI comprises at least one of a portion of a region of the input image or at least one object included in the input image.

14. The method of claim 13, wherein the object of interest comprises at least one of a road vanishing point, a road marking, a pedestrian, a vehicle, a traffic light, a lane marking, a traffic sign, a human, an animal, a plant, or a building.

15. A non-transitory computer-readable storage medium storing instructions that, when executed by a processor, cause the processor to perform the method of claim 1.

16. An apparatus for detecting an object of interest, the apparatus comprising:
a sensor configured to acquire an input image, the input image including at least one external image of a front view or each side view of the vehicle while driving on a road; and
a processor configured to set a region of interest (ROI) in the input image, to generate a restoration image corresponding to the ROI, and to detect the object of interest from the restoration image by:
setting the object of interest in the input image corresponding to a current point in time t or a next point in time t+1 based on a detection result of the input image corresponding to a previous point in time t−1, and
redetecting an object based on a time-varying method of only detecting a region of the object of interest by performing up-sampling,
wherein a resolution of the restoration image is greater than a resolution of the input image.

17. The apparatus of claim 16, wherein the processor is further configured to detect at least one object comprising a lane marking in the input image, and to set the ROI based on the at least one object.

18. The apparatus of claim 16, wherein the processor is further configured to detect a road vanishing point where a lane marking converges based on a segmentation of the lane marking in the input image, and to set a region corresponding to the road vanishing point as the ROI.

19. The apparatus of claim 16, wherein the processor is further configured to calculate a reliability score of at least one object in the input image, and to set the ROI based on the reliability score.

20. The apparatus of claim 19, wherein the processor is further configured to calculate the reliability score of the at least one object by detecting a bounding box based on deep learning or image processing, and to set a region of the bounding box as the ROI based on a comparison of the reliability score to a threshold value.

21. The apparatus of claim 16, wherein the processor is further configured to perform super resolution to increase pixel information by up-sampling an image corresponding to the ROI, and to generate the restoration image based on the increased pixel information.

22. An apparatus for detecting an object of interest comprising:
a sensor configured to acquire an input image, the input image including at least one external image of a front view or each side view of the vehicle while driving on a road;
a head-up display (HUD);
a memory configured to store map information and instructions; and
a processor configured to execute the instructions to:
identify an object comprising a lane marking in the input image,
set a region of interest (ROI) based on the object,
generate a restoration image corresponding to the ROI,
detect the object of interest from the restoration image having a higher resolution than a resolution of the input image, and
output the restoration image and the object of interest through the HUD, wherein the processor is configured to detect the object of interest by:
setting the object of interest in the input image corresponding to a current point in time t or a next point in time t+1 based on a detection result of the input image corresponding to a previous point in time t−1, and
redetecting an object based on a time-varying method of only detecting a region of the object of interest by performing up-sampling.

23. The apparatus of claim 22, wherein the memory is further configured to store information on the object of interest detected from the restoration image, and to provide information from object of interest detected from previous restoration image.

* * * * *